(12) United States Patent
Clevorn (10) Patent No.: US 8,780,868 B2
(45) Date of Patent: Jul. 15, 2014

(54) METHOD FOR TRANSMITTING DATA BETWEEN A RADIO TRANSMITTING DEVICE AND A RADIO RECEIVING DEVICE (75) Inventor: Thorsten Clevorn, Duesseldorf (DE)

(73) Assignee: Intel Mobile Communications GmbH, Neubiberg (DE)

( * ) Notice: Subject to any disclaimer, the term of this patent is extended or adjusted under 35 U.S.C. 154(b) by 198 days.

(21) Appl. No.: 13/280,454

(22) Filed: Oct. 25, 2011

(65) Prior Publication Data

US 2013/0101061 A1    Apr. 25, 2013

(51) Int. Cl.
*H04B 7/185*    (2006.01)
*H04W 4/00*    (2009.01)

(52) U.S. Cl.
USPC ........... 370/332; 370/318; 370/342; 375/285; 455/522

(58) Field of Classification Search
USPC .......... 370/329–332, 342–469; 375/259–285; 455/70–226, 450–522
See application file for complete search history.

(56) References Cited

U.S. PATENT DOCUMENTS

| | | | | |
|---|---|---|---|---|
| 5,898,682 A * | 4/1999 | Kanai | | 370/331 |
| 6,721,564 B1 * | 4/2004 | Kobayashi | | 455/436 |
| 6,904,290 B1 * | 6/2005 | Palenius | | 455/522 |
| 6,907,248 B2 * | 6/2005 | Lee et al. | | 455/450 |
| 7,356,003 B2 * | 4/2008 | Ogura | | 370/332 |
| 7,408,894 B2 * | 8/2008 | Kim et al. | | 370/318 |
| 7,936,690 B2 * | 5/2011 | Willenegger | | 370/252 |
| 8,135,341 B2 * | 3/2012 | Furukawa et al. | | 455/39 |
| 8,311,569 B2 * | 11/2012 | Furukawa et al. | | 455/522 |
| 2005/0237932 A1 * | 10/2005 | Liu | | 370/230 |
| 2006/0023687 A1 * | 2/2006 | Cheng et al. | | 370/342 |

OTHER PUBLICATIONS

3GPP ETSI TS 125 211 V10.0.0 (May 2011), p. 1-60.

* cited by examiner

*Primary Examiner* — Man Phan
(74) *Attorney, Agent, or Firm* — Eschweiler & Associates, LLC (57) ABSTRACT

A method for transmitting data between a radio transmitting device and a radio receiving device includes transmitting a frame structure over a radio channel, the frame structure including a control channel and a data channel. The method further includes detecting a quality degradation of the radio channel, selecting a bit from the data channel and increasing a transmission power of the selected bit when the quality degradation of the radio channel is detected.

22 Claims, 8 Drawing Sheets

METHOD FOR TRANSMITTING DATA BETWEEN A RADIO TRANSMITTING DEVICE AND A RADIO RECEIVING DEVICE

FIELD

The invention relates to methods for transmitting data between a radio transmitting device and a radio receiving device as well as to radio transmitting devices and radio receiving devices.

BACKGROUND

Radio transmitting devices and radio receiving devices may communicate with each other over a radio channel. During the communication, the quality of transmitted data may be influenced by the radio channel.

Methods for transmitting data between radio devices as well as the performance of the radio devices constantly have to be improved. Further, it is particularly desirable to provide a stable connection between radio devices and improve the stability of employed radio channels. For these and further reasons there is a need for the present invention.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. Like reference numerals designate corresponding similar parts.

DETAILED DESCRIPTION

In the following detailed description, reference is made to the accompanying drawings, which form a part thereof, and in which is shown by way of illustration specific embodiments in which the invention may be practiced. It is understood that other embodiments may be utilized and structural or logical changes may be made without departing from the scope of the present invention. The following detailed description, therefore, is not to be taken in a limiting sense, and the scope of the present invention is defined by the appended claims.

In the following, various radio transmitting devices, radio receiving devices and methods for transmitting data between such devices are described separately or with reference to each other. It is understood that comments made in connection with a described method may also hold true for a corresponding device configured to perform the method and vice versa. For example, if a specific method step is described, a corresponding device may include a unit to perform the described method step, even if such a unit is not explicitly described or illustrated in the figures. Further, it is understood that the features of the various exemplary embodiments described herein may be combined with each other, unless specifically noted otherwise.

The described devices and methods may be designed for implementing a UMTS (Universal Mobile Telecommunications System) standard, e.g. one of the Release 99, 4, 5, 6, 7, 8, 9 and higher versions. The devices and methods may further implement an HSPA (High Speed Packet Access) mobile telephony protocol, such as HSDPA (High Speed Downlink Packet Access), HSUPA (High Speed Uplink Packet Access) and HSPA+ (Evolved HSPA). The devices and methods may further be designed to implement standards such as the WCDMA (Wideband Code Division Multiple Access) standard, the LTE (Long Term Evolution) mobile communications standard, the E-UTRAN (Evolved Universal Terrestrial Radio Access Network) standard, the HSOPA (High Speed Orthogonal Frequency Division Multiplex Packet Access) standard, the Super 3G standard defined by the 3GPP (Third Generation Partnership Project) standardization organization or the GSM (Global System for Mobile communications) standard. In addition, the described devices and methods may be designed to implement the WiMAX (Worldwide Interoperability for Microwave Access) standard or the IEEE (Institute of Electrical and Electronics Engineers) 802.16 standard.

The methods and devices described below may be implemented in a base station (or NodeB) or a mobile device (or mobile station or User Equipment (UE)). Base stations and mobile devices usually include a radio transmitting device for transmitting radio signals and a radio receiving device for receiving radio signals. The radio transmitting and radio receiving devices may include integrated circuits and/or passive devices and may be manufactured according to different technologies. For example, the circuits may be designed as logic integrated circuits, analog integrated circuits, mixed signal integrated circuits, memory circuits and/or integrated passives. Integrated circuits may include electrical and/or optical circuit elements.

The methods and devices described herein may be configured to transmit and/or receive radio signals. Radio signals may be or may include radio frequency signals radiated by a radio transmitting device (or radio transmitter or sender) with a radio frequency (RF) lying in a range of about 3 Hz to 300 GHz. Said frequency range corresponds to frequencies of alternating current electrical signals used to produce and detect radio waves.

For a mobile data transmission, the radio channel may depend on positions of a mobile device and a base station and may change according to a movement of the mobile device. If a mobile device gets into bad radio conditions (e.g. if a radio channel is heavily impaired by noise or interferences), the quality of a data reception may degrade such that bit errors and block errors may occur. The bits of a radio frame or radio slot may belong to different transport channels (TrChs). For example, some bits may belong to control data streams (e.g. signaling information) while some bits may belong to user data streams (e.g. voice and internet data, etc.). The different transport channels may have a different demand for reliability. For example, in good conditions (e.g. the radio channel is only marginally impaired by noise or interferences), the user expects best quality for voice and Internet data streams while in bad conditions (e.g. the radio channel is heavily impaired by noise or interferences), the user may tolerate lower quality or even some short outages. In contrast, a loss of a control data packet in good conditions may not cause any harm, since there is enough time for a retransmission of the control data packet. However, in bad conditions, the reception of control packets e.g. carrying signaling information may be critical. For example, these control packets enable the mobile device to do a handover to another cell or to switch to a more robust mode.

The different quality of service demands of different transport channels may be considered by different channel coding or by different puncturing rates of the channel coding. These techniques may not provide changing the transmission power of control and user data transport channels. Thus, for critical scenarios, no appropriate reaction may be possible e.g. when the base station is in a power limitation and cannot increase the downlink power anymore, but gets CRC errors on important messages of the control data stream.

Figure 1:
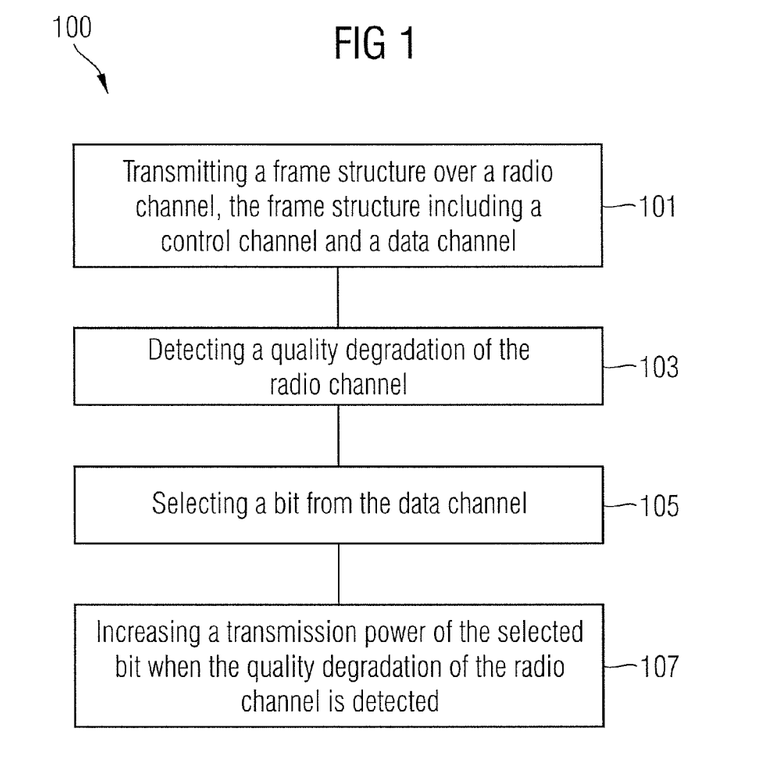
FIG. 1 schematically illustrates a method 100 for transmitting data between a radio transmitting device and a radio receiving device as an exemplary embodiment.

FIG. 1 schematically illustrates a method 100 for transmitting data between a radio transmitting device and a radio receiving device. The method 100 includes a method step 101 of transmitting a frame structure over a radio channel, the frame structure including a control channel and a data channel. The method 100 further includes a method step 103 of detecting a quality degradation of the radio channel and a method step 105 of selecting a bit from the data channel. In a method step 107, a transmission power of the selected bit is increased when the quality degradation of the radio channel is detected.

Figure 2:
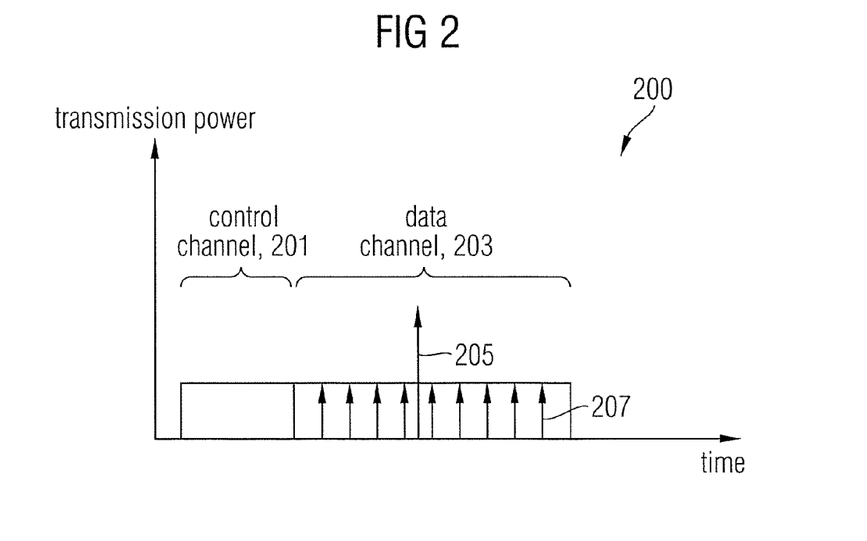
FIG. 2 schematically illustrates a frame structure 200.

An exemplary frame structure 200 that may be transmitted over a radio channel according to method 100 is illustrated in FIG. 2. The frame structure 200 includes a control channel 201 and a data channel 203. The control channel 201 includes a plurality of bits that are transmitted with equal transmission power. The data channel 203 includes a plurality of bits 207 that are transmitted with equal transmission power and one bit 205 that is transmitted with an increased transmission power. It is understood that not only one, but also multiple bits 205 may be transmitted with an increased transmission power. The multiple bits 205 may, for example, form a transport channel.

The control channel 201 may be positioned before or after the data channel 203. The bits of the control channel 201 and the bits 207 of the data channel 203 may be transmitted by using a predetermined transmission power. According to method 100, one or more bits 205 from the data channel 203 may be selected. The transmission power of these selected bits 205 is increased when a quality degradation of the radio channel is detected. In one example, the transmission power of the non-selected bits 207 of the data channel 203 and the transmission power of the bits of the control channel 201 may remain unchanged. In another example, the transmission power of the non-selected bits 207 of the data channel 203 may be decreased and the transmission power of the bits of the control channel 201 may remain unchanged. In yet another example, the transmission power of both, the non-selected bits 207 of the data channel 203 and the bits of the control channel 201 may be decreased. In yet another example, the transmission power of the non-selected bits 207 of the data channel 203 may remain unchanged and the transmission power of the bits of the control channel 201 may be decreased.

According to a further embodiment, the data channel 203 may be frame-aligned to the control channel 201. Here, the term "frame-alignment" may indicate that a predetermined bit position (e.g. a start position) of the data channel 203 is aligned to a predetermined bit position (e.g. a start position) of the control channel 201. When the control channel 201 as received by the radio receiving device has been synchronized with the control channel 201 as transmitted by the radio transmitting device, the time delay and the phase relation are known. For the case of the data channel 203 being frame-aligned to the control channel 201, the same time delay and the same phase relation are valid as determined for the control channel 201. Once synchronization is performed by using the bits of the control channel 201, the whole data structure including control channel 201 and data channel 203 is synchronized.

According to a further embodiment, the radio channel may include a downlink channel. The frame structure including control channel 201 and data channel 203 may then be transmitted over a downlink channel, i.e., from the base station to the mobile device in downlink direction.

According to a further embodiment, the control channel 201 may transmit pilot data. Pilot data may be used by a radio receiving device to synchronize the radio receiving device with the radio transmitting device. The pilot symbols included in the pilot data of the control channel 201 are symbols known to the radio receiving device. Thus, the radio receiving device may perform channel equalization by using the pilot symbols and perform slot synchronization, frame synchronization and code group identification, for example according to the UMTS standard.

According to a further embodiment, the data channel 203 may transmit one or both of user data and control data. User data of the data channel 203 may be or may include data intended for a user. Control data of the data channel 203 may be or may include signaling information intended for the UE of a user and/or for other communication nodes in the communication path towards the user. The UE and/or the communication nodes in the communication path may be controlled by the control data to enter a specific state of transmission in order to configure a communication link. Control data of the data channel may also be associated with signaling data.

Note that control data as defined in this description may not necessarily be carried by the control channel 201, but may also be carried by the data channel 203. In this case, control data may be related to control messages or signaling messages of higher communication layers intended for initializing a communication with a user on the higher communication layers. Thus, control data may be transported by the data channel 203 while the control channel 201 may be used for setting up a (physical) radio bearer or a radio channel on the physical communication layer, i.e. on Layer 1 of the communication protocol.

According to a further embodiment, the control channel 201 may include a dedicated physical control channel and/or the data channel 203 may include a dedicated physical data channel. Note that the term "dedicated channel" may particularly refer to a channel dedicated or intended for a specific user. In addition, the term "physical channel" may particularly refer to a channel of a physical layer of transmission. A physical transmission layer is e.g. defined in the OSI (Open System Interconnection) reference model. In one example, the dedicated physical control channel may be or may include a Dedicated Physical Control Channel (DPCCH) and the dedicated physical data channel may be or may include a Dedicated Physical Data Channel (DPDCH) according to a terminology used in connection with the UMTS standardization, e.g. the technical specification 3GPP TS 25.211 which is included herein by reference.

According to a further embodiment, the data channel 203 may include a signaling channel configured to transmit a control message. A signaling channel may particularly be used for signaling a configuration of a communication link in a communication network, for example an initiation of a communication link between a UE and a network node or an initiation of a communication link between a first user and a second user. A control message transmitted via the signaling channel may be or may include a message directed to a communication node in the network for initiating a state change of the communication node. The state change may e.g. enable the communication node to receive specific data packets or to initiate a communication link towards another network node connected to a UE or to initiate the communication node to connect to a UE.

According to a further embodiment, the data channel 203 may include a signaling channel transmitting a control message and the bit 205 to be selected from the data channel 203 may be selected from the signaling channel. When the bit 205 is selected from the signaling channel, the transmission power of signaling information carried over the signaling channel may be increased in bad radio conditions, thereby increasing the probability of a correct reception of the signaling information. Thus, the communication link may be held even in bad conditions of the radio channel. The user might experience a short outage in voice or data, but this is still more acceptable than a connection loss. Besides, the situation of bad radio conditions will usually not last for a long time.

According to a further embodiment, a method for transmitting data between a radio transmitting device and a radio receiving device as described herein may further include acknowledging a reception of a control message sent by the radio transmitting device. For example, the control message may be a message transmitted by the signaling channel of the data channel 203. Some of such control messages sent by a radio transmitting device have to be acknowledged by a radio receiving device. The control message may be a signaling message of the data channel 203 requiring such an acknowledgment. Depending on the reception of the acknowledgment by the radio transmitting device, a quality of the radio link may be estimated. If most of the control messages are not acknowledged, the radio channel may be estimated to be in a bad condition. Alternatively, if most of the control messages are acknowledged, the radio channel may be estimated to be in a good condition.

According to a further embodiment, detecting the quality degradation of the radio channel may depend on acknowledging a reception of a control message sent by the radio transmitting device. The control message may be a message transmitted by the signaling channel of the data channel 203. Based on an acknowledgment or on an acknowledgment rate, the quality degradation of the radio channel may be detected. If one or more acknowledgments are missing and/or if the acknowledgment rate is decreasing, the quality degradation may increase. If one or more acknowledgments are correctly received and/or if the acknowledgment rate is increasing, the quality degradation may decrease.

According to a further embodiment, detecting the quality degradation may include one or more of the following: a control message is not acknowledged, a number of control messages not being acknowledged is increased, measurement reports sent by the radio receiving device to the radio transmitting device over the radio channel indicate the quality degradation of the radio channel and the radio receiving device is operated in a compressed mode.

If the control message is not acknowledged, the radio channel may be in a bad condition (e.g. corrupted by noise and/or interference) such that an acknowledgment sent by the radio receiving device over the radio channel may be distorted and may not correctly be received by the radio transmitting device. Depending on the noise and/or interference on the radio channel, some acknowledgments may be correctly received while other acknowledgments may be not correctly received. The number of control messages not being acknowledged may be a measure for the quality of the radio channel. If the number of control messages not being acknowledged is increasing, the radio channel may be in a bad condition. If the number of control messages not being acknowledged is decreasing, the quality of the radio channel may be in a good condition (e.g. the quality of the radio channel is improving).

Note that the signaling channel of the data channel 203 may transmit control measurement reports indicating a quality and/or a quality degradation of the radio channel. The quality of the radio channel may be detected by evaluating these measurement reports.

As stated above, the radio receiving device may be operated in a compressed mode that may indicate that the radio channel is in a bad condition. The radio receiving device switches to a compressed mode and compresses information normally transmitted during a frame either by code puncturing or by changing an FEC (Forward Error Correction) rate. During idle periods of the frame that are generated due to the compression, the radio receiving device may request the radio transmission device to switch to another transmission mode requiring a lower transmission bandwidth, for example switching from a UMTS transmission to a GSM transmission. In 3GPP, the compressed mode may thus be used for performing a hand-over between UMTS and GSM. The GSM-compatible multiframe structure of UMTS, with the superframe being a multiple of 120 ms, allows similar timing for inter-system measurements as in the GSM system itself. If the radio receiving device is operated in compressed mode, a quality degradation may be detected.

According to a further embodiment, the data channel 203 may include a user data channel configured to transmit at least one of voice data and internet data. Voice data may be or may include samples of speech to be transmitted over a user data channel. Voice data may also be or may also include a data stream of sampled voice, e.g. a voice message and/or data included in an audio channel of a video file. Internet data may include data transmitted over the internet, e.g. a file downloaded from a server such as a video on demand file or a communication over the Internet, e.g. a voice over IP session.

According to a further embodiment, a method for transmitting data between a radio transmitting device and a radio receiving device as described herein may further include decreasing a transmission power of a further bit of the frame structure 200, the further bit differing from the selected bit 205. In one example, the further bit may be a bit of the data channel 203. In another example, the further bit may be a bit of the control channel 201.

In critical scenarios more transmit power may be allocated to bits of important transport channels than to bits of less important transport channels. This way, the important transport channels may be transmitted by using a higher power, thereby making them less sensitive to noise and/or interferences of the radio channel. Hence, important transport channels may be correctly received while less important transport channels may or may not be correctly received. Note that important transport channels may be secured by a Cyclic Redundancy Check (CRC) procedure.

According to a further embodiment, the method step 107 of increasing a transmission power of the selected bit may be performed adaptively in order to improve the system robustness and/or the user perception. The boosting (i.e. the increase of transmission power) of the bit(s) may depend on a detection of certain scenarios, e.g. bad conditions of the radio channel, detected by the network.

According to a further embodiment, a step-size of the transmission power of the selected bit(s) 205 may be adaptively increased, e.g. by a first increase of e.g. 3 dB if a quality degradation is detected, by a second increase of e.g. 3 dB if the quality degradation is still detected and so on until a maximum allowable threshold value has been reached and/or until the quality degradation is no longer detected.

According to a further embodiment, an overall transmission power of the frame structure may not exceed a predetermined (particularly non-zero) threshold value, e.g. an upper threshold prescribed or determined by a power management of the radio transmission device. Bits of important transport channels may get more transmit power while bits of less important transport channels may get less or no power such that the overall power budget is not changed or does not exceed the predetermined (upper) threshold. Keeping the overall power budget constant may be a requirement, since other users shall not be effected and also the total transmit power of a base station may be limited by physical and legal constraints. Considering that several other users and common channels contribute to the total transmit power of a base station, the varying power of a single user does not have significant effects on the remaining system.

According to a further embodiment, a method for transmitting data between a transmitting device and a radio receiving device as described herein may further include muting a transmission power of a further bit of the frame structure 200, the further bit differing from the selected bit 205. In one example, the further bit may be a bit of the data channel 203. Note that some bits of the frame structure 200 belonging to less important transport channels may even be muted, i.e. switched off. In particular, a muting of further bit(s) may happen during periods of bad conditions. Depending on the time of such periods, the muting may nearly have no influence on the user, for example, when missing data is retransmitted after a hand-over to a radio channel being in a good condition.

According to a further embodiment, the method for transmitting data between a transmitting device and a radio receiving device as described herein may further include performing a cyclic redundancy check (CRC) on the basis of data transmitted over the data channel 203. The result of the CRC may be a measure for indicating a quality of the radio channel. If the CRC is successful, the radio channel may be in a good condition. Usually, important channels may be protected by a CRC check.

According to a further embodiment, the frame structure may be based on one of the wireless standards UMTS, GSM and LTE. In one example, the frame structure may be based on a 3GPP standard. According to the 3GPP technical specification TS 25.211 V7.9.0, transport channels are services offered by Layer 1 to the higher layers. Transport channels may include dedicated channels, using inherent addressing of a UE and common channels, using explicit addressing of the UE if addressing is needed.

Figure 3:
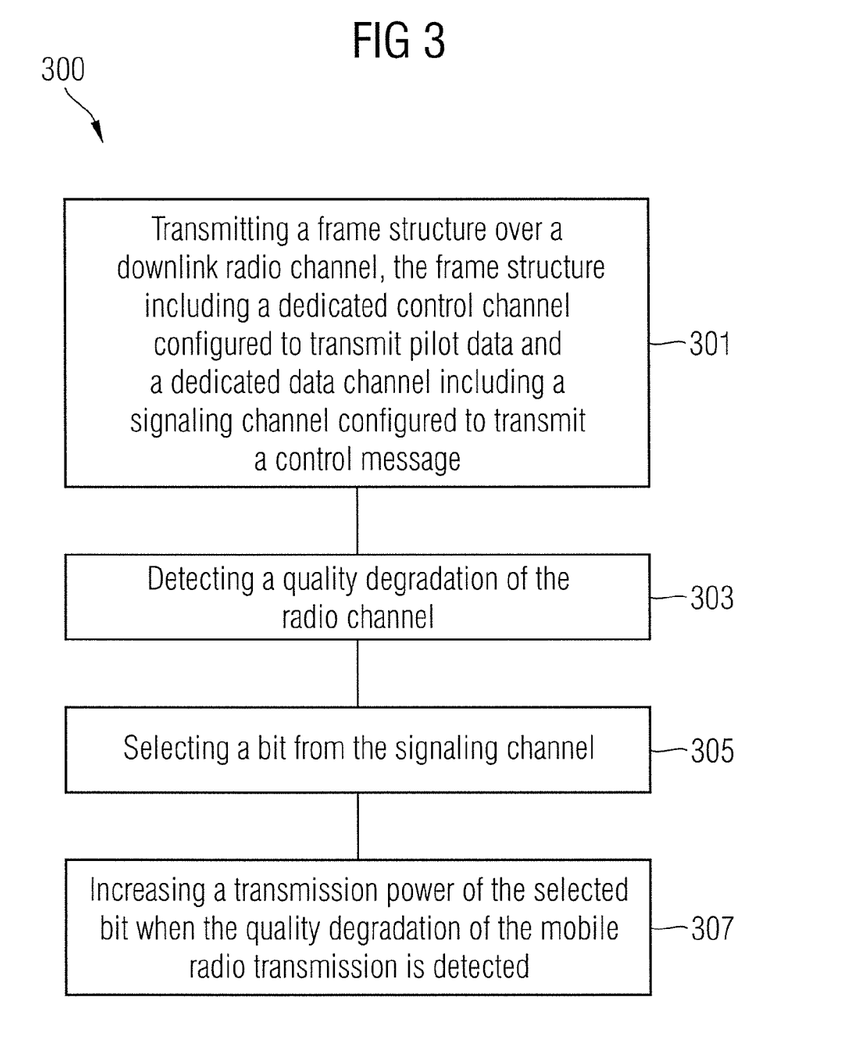
FIG. 3 schematically illustrates a method 300 for transmitting data between a radio transmitting device and a radio receiving device as a further exemplary embodiment.

FIG. 3 schematically illustrates a further method 300 for transmitting data between a radio transmitting device and a radio receiving device. The method 300 includes a method step 301 of transmitting a frame structure over a downlink radio channel, the frame structure including a dedicated control channel configured to transmit pilot data and a dedicated data channel, the dedicated data channel including a signaling channel configured to transmit a control message. The method 300 further includes a method step 303 of detecting a quality degradation of the radio channel and a method step 305 of selecting a bit from the signaling channel. In a method step 307, a transmission power of the selected bit is increased when the quality degradation of the mobile radio transmission is detected.

Exemplary frame structures that may be transmitted e.g. over a downlink radio channel according to the above-mentioned methods are depicted in FIGS. 4, 5, 6 and 7 and described in the following.

Figure 4:
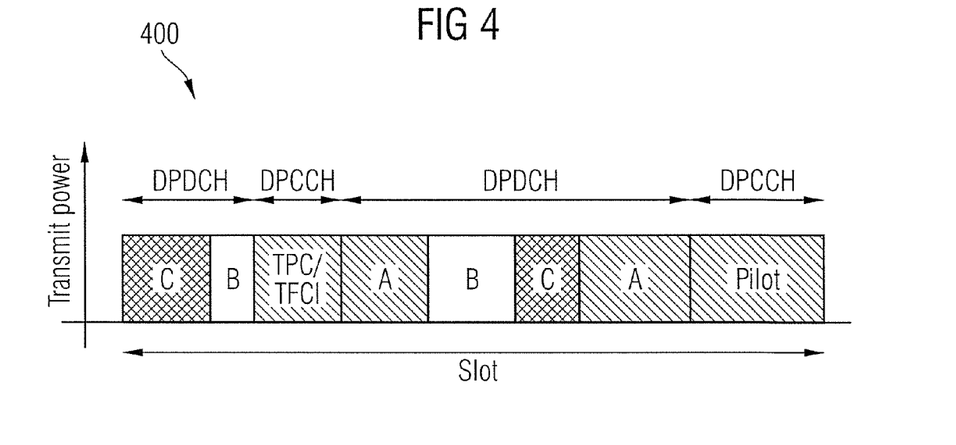
FIG. 4 schematically illustrates a further frame structure 400.

FIG. 4 schematically illustrates a frame structure 400 that may be transmitted over a radio channel. The frame structure 400 includes a dedicated control channel (DPCCH) with a Transmission Power Control (TPC)/Transport Format Combination Indicator (TFCI), and a pilot part and a dedicated data channel (DPDCH) including a first transport channel A (TrCh A), a second transport channel B (TrCh B) and a third transport channel C (TrCh C). In one example, the transport channel A may be a transport channel transmitting voice data, the transport channel B may be a signaling channel transmitting control messages and the transport channel C may be a transport channel transmitting internet data.

The transport channels A, B and C may contain data generated at higher layers and mapped in the physical layer to different physical channels. The transport format of each transport channel may be identified by the Transport Format Identifier (TFI). The physical layer may combine several TFI information into the Transport Format Combination Identifier (TFCI). In addition, several transport channels may be multiplexed together to form the dedicated data channel DPDCH.

According to the previously described methods, a bit or multiple bits from the signaling channel (i.e. TrCh B) of the dedicated data channel DPDCH may be selected and a transmission power of these bit(s) may be increased when a quality degradation of the mobile transmission is detected. In FIG. 4, the power level is equal for all bits, indicating that no quality degradation has been detected.

Figure 5:
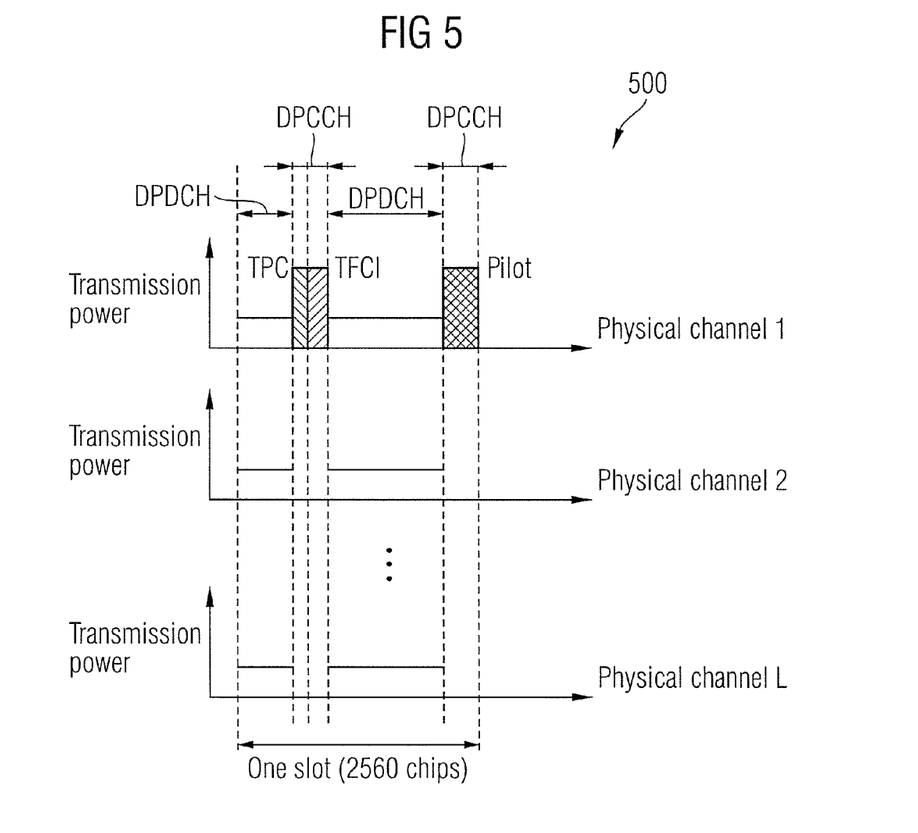
FIG. 5 schematically illustrates a further frame structure 500.

FIG. 5 schematically illustrates a frame structure 500 that may be transmitted over a radio channel. The frame structure 500 includes a plurality of physical channels 1 to L to be transmitted in parallel during one time slot. According to the UMTS standard a time slot may include 2560 chips and 15 time slots may constitute a frame of length 10 ms (milliseconds). Each of the physical channels 1 to L may include a dedicated data channel (DPDCH) including multiple transport channels, e.g. a first transport channel (TrCh A), a second transport channel (TrCh B) and a third transport channel (TrCh C) as described in connection with FIG. 4. In FIG. 5, only the first physical channel 1 includes a dedicated control channel DPCCH with TPC/TPCI and pilot information.

The dedicated control channel DPCCH may be used to carry control information generated at Layer 1. The Layer 1 control information may include known pilot bits to support channel estimation for coherent detection, TPC commands, feedback information (FBI) and an optional TFCI. The TFCI may inform a receiver about the instantaneous transport format combination of transport channels mapped to the simultaneously transmitted DPCCH radio frame. According to the 3GPP standard, there may only be one DPCCH on each radio link. FIG. 5 illustrates one slot of the frame structure of the DPDCH and the DPCCH. Here, each radio frame of length 10 ms is split into five subframes, each of which includes three slots similar to the slot of FIG. 5. Each slot has a length of $T_{slot}=2560$ chips, corresponding to one power-control period. In one example, according to the 3GPP standard TS 25.211, the dedicated data channel DPDCH and the dedicated control channel DPCCH may be frame aligned with each other.

Figure 6:
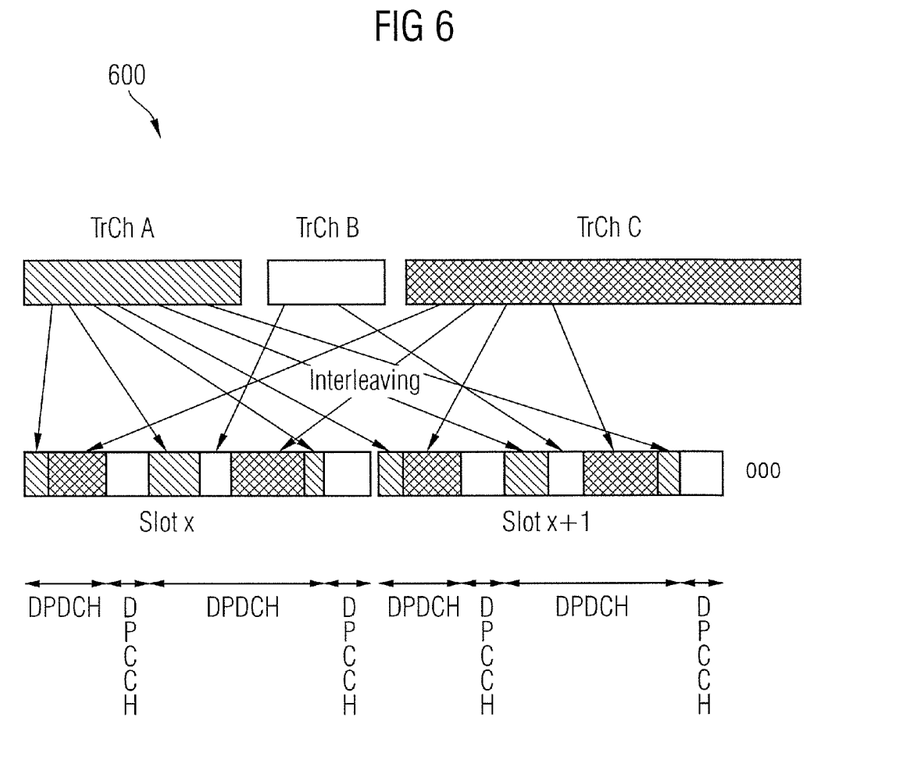
FIG. 6 schematically illustrates a further frame structure 600.

FIG. 6 schematically illustrates a frame structure 600 that may be transmitted over a radio channel. The frame structure 600 includes a dedicated control channel DPCCH and a dedicated data channel DPDCH including a transport channel A (TrCh A), a transport channel B (TrCh B) and a transport channel C (TrCh C). The transport channels may be structured according to the description of FIG. 4 or 5. All three transport channels may be interleaved over different time slots x and x+1 of the transmission as shown in FIG. 6. Here, the different transport channels A, B and C may be mapped to discrete sections of a slot.

Due to interleaving, the transport channels A, B and C may be spread across slots of the transmission time interval (TTI). In data fields of a slot, the transport channels may be clustered, i.e. no real interleaving inside a slot may take place. Here, the different sections of the transport channels A, B and C are interleaved over different slots, but not interleaved within a single slot. In one example, a transmission power of selected bits of transport channel B (i.e. the signaling channel) may be increased. In another example, a transmission power of bits of transport channels A and C carrying voice and internet data may remain unchanged or may be decreased.

Figure 7:
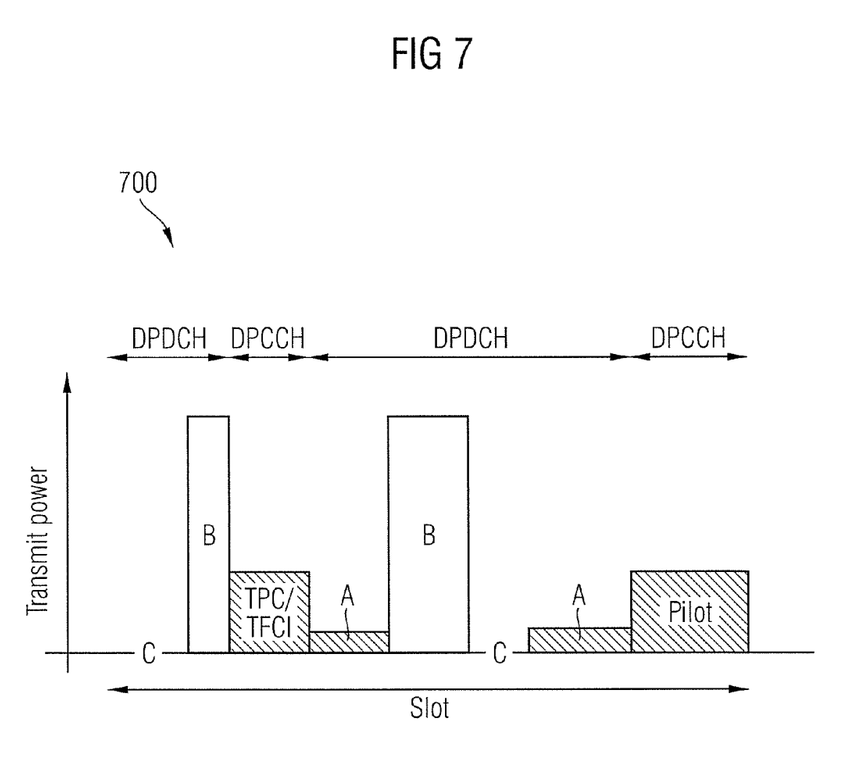
FIG. 7 schematically illustrates a further frame structure 700.

FIG. 7 schematically illustrates a frame structure 700 which may be transmitted over a radio channel. Note that comments made in connection with method 100 of FIG. 1 and frame structure 200 of FIG. 2 may also hold true for FIG. 7. In addition, the frame structure 700 is partly similar to the frame structure 400 of FIG. 4, since it includes a dedicated control channel DPCCH with TPC/TFCI, and pilot information and a dedicated data channel DPDCH including transport channels A, B and C. Again, the transport channel A may transmit voice data, the transport channel B may be a signaling channel transmitting control messages and the transport channel C may transmit internet data. The transmission powers of the transport channels A, B and C may be "muted" (see transport channel C), "decreased" (see transport channel A) or "increased" (see transport channel B).

In one example, the signaling channel (see TrCh B) may be boosted for the case of a detected or estimated bad condition, because it may be important that e.g. an "active set update" (ASU) or an "InterRat" message reaches the UE while a voice channel or a user data message (see TrChs A and C) may be less relevant under such circumstances. Thus, the power of bit(s) of the voice transport channel (TrCh A) may be reduced while bit(s) of the user data channel (TrCh C) may be completely muted. An ASU message transmitted by the signaling channel (TrCh B) may be an integer value proportional to a received signal strength measured by a mobile device and may be used in hand-over procedures for decision which cell delivers the higher power. An "InterRat" message transmitted by the signaling channel (TrCh B) may be part of a hand-over procedure from e.g. UMTS to e.g. GSM.

Note that the unequal power transmission levels as illustrated in FIG. 7 do not need to be necessarily applied during the whole transmission. In one example, the unequal power transmission may only happen if the NodeB detects that a UE is in a bad condition and an important message needs to be transmitted on a specific transport channel, e.g. TrCh B in FIG. 7. This boost may then be effected only for the length of the control message, e.g. 80 ms, thus hardly noticeable by the user. Alternatively, if there is no data on a transport channel, i.e. no control message to be send, this transport channel may be muted such that energy may be used to boost other transport channels.

According to a further embodiment, the NodeB may detect if the UE is in a bad condition by using one or more of the following indicators. In one example, a bad condition may be detected if the UE does not acknowledge an important control message. For this case, bits of a retransmission may be boosted. In another example, a bad condition may be detected if a difference between sent and acknowledged messages increases, for example by a value ranging from 1 to 10. In yet another example, the UE may frequently send measurement reports to the network. From these measurement reports the NodeB may then conclude on the current condition. In yet another example, a bad condition may be detected if the UE is operated in a compressed mode and already searching for another option. For this case, a bad condition may usually be present.

Note that, although the description of the frame structures of FIGS. 4 to 7 may be used in UMTS, alternative frame structures may be designed according to further wireless standards, e.g. LTE or GSM. Here, an arrangement of bits and slots may be different, but bits may be adaptively boosted based on their priority. Even if some of the described aspects may not be standard compliant, these aspects may be applied in various standards, as they improve respective methods and devices the system and do not harm existing standardized solutions. In this connection, note further that modifications outside the standard may frequently be applied.

Figure 8:
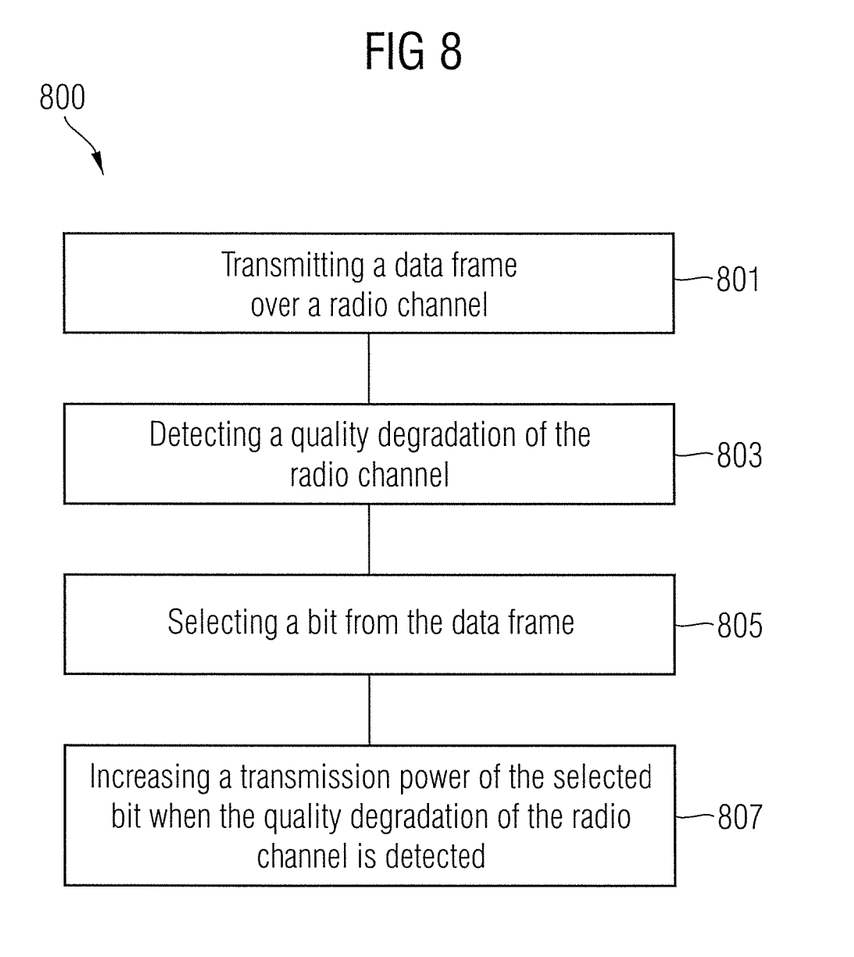
FIG. 8 schematically illustrates a method 800 for transmitting data between a radio transmitting device and a radio receiving device as a further exemplary embodiment.

FIG. 8 schematically illustrates a method 800 for transmitting data between a radio transmitting device and a radio receiving device. The method 800 includes a method step 801 of transmitting a data frame over a radio channel. For example, the data frame may be structured according to the frame structure 900 of FIG. 9. The method 900 further includes a method step 803 of detecting a quality degradation of the radio channel and a method step 805 of selecting a bit from the data frame. In a method step 807, a transmission power of the selected bit is increased when the quality degradation of the radio channel is detected. Note that comments made in connection with methods 100 and 300 of FIGS. 1 and 3 may also hold true for method 800.

Figure 9:
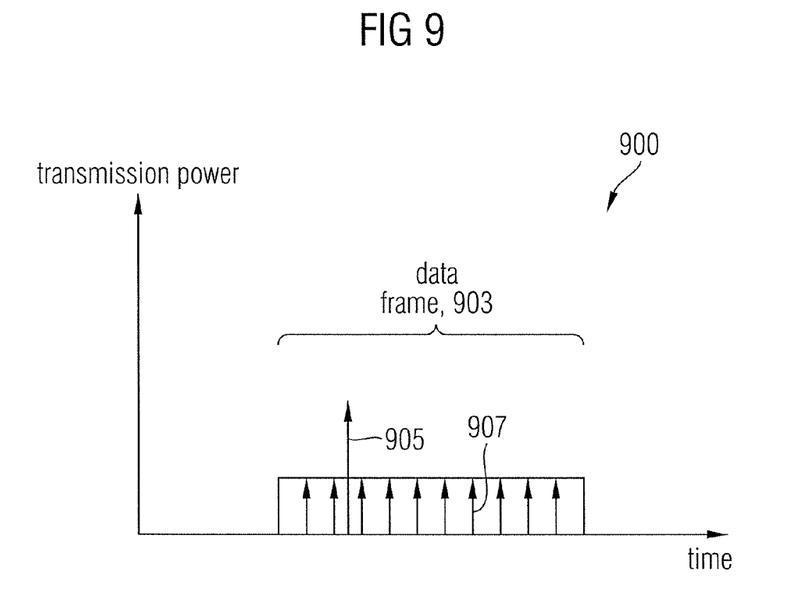
FIG. 9 schematically illustrates a further frame structure 900.

FIG. 9 schematically illustrates a frame structure 900 which may be transmitted over a radio channel. A data frame 903 includes a plurality of bits 907 which are transmitted with an equal transmission power and a bit 905 which is transmitted with an increased transmission power. In a further example, multiple bits 905 may be transmitted with an increased transmission power. Note that comments made in connection with previously described methods and frame structures may also be applied to FIG. 9.

Figure 10:
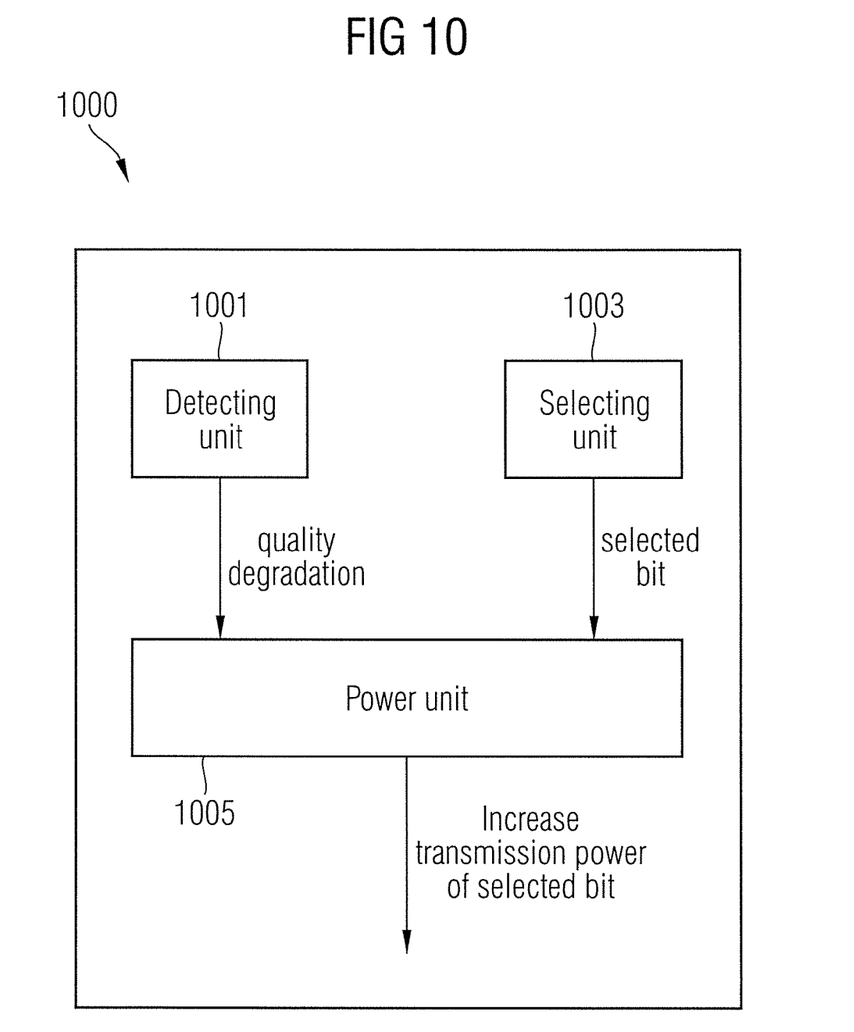
FIG. 10 schematically illustrates a radio transmitting device 1000 as an exemplary embodiment.

FIG. 10 schematically illustrates a radio transmitting device 1000 configured to transmit a frame structure over a radio channel. For example, the frame structure may be similar to one of the frame structures of FIGS. 2, 4 to 7 and 9. In addition, the radio transmitting device 1000 may be read in connection with any of the methods of FIGS. 1, 3 and 8. The radio transmitting device 1000 includes a detecting unit 1001 that is configured to detect a quality degradation of the radio channel (see method steps 103, 303, 803) as well as a selecting unit 1003 that is configured to select a bit from the data channel (see method steps 107, 305, 805). The radio transmitting device 1000 further includes a power unit 1005 that is configured to increase a transmission power of the selected bit when the quality degradation of the radio channel is detected by the detecting unit (see method steps 107, 307, 807). For example, the radio transmitting device 1000 may be implemented in a base station as a radio transmitter to transmit data in a downlink direction, but may also be implemented in a mobile device as a transmitter to transmit data in an uplink direction.

In addition, while a particular feature or aspect of an embodiment of the invention may have been disclosed with respect to only one of several implementations, such feature or aspect may be combined with one or more other features or aspects of the other implementations as may be desired and advantageous for any given or particular application. Furthermore, to the extent that the terms "include", "have", "with", or other variants thereof are used in either the detailed description or the claims, such terms are intended to be inclusive in a manner similar to the term "comprise". Furthermore, it should be understood that embodiments of the invention may be implemented in discrete circuits, partially integrated circuits or fully integrated circuits or programming means. Also, the terms "exemplary", "for example" and "e.g." are merely meant as an example, rather than the best or optimal.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein.

What is claimed is:

1. A method for transmitting data between a radio transmitting device and a radio receiving device, comprising:
   transmitting a frame structure over a downlink radio channel, the frame structure comprising a downlink control channel and a downlink data channel;
   detecting a quality degradation of the downlink radio channel;
   selecting a bit from the downlink data channel; and
   increasing a transmission power of the selected bit with respect to a transmission power of a non-selected bit of the downlink data channel when the quality degradation of the radio channel is detected.

2. The method of claim 1, wherein the data channel is frame-aligned to the downlink control channel.

3. The method of claim 1, wherein the downlink control channel is configured to transmit pilot data.

4. The method of claim 1, wherein the downlink data channel is configured to transmit one or both of user data and control data.

5. The method of claim 1, wherein the downlink control channel comprises a dedicated physical control channel and the data channel comprises a dedicated physical data channel.

6. The method of claim 1, wherein the downlink data channel comprises a signaling channel configured to transmit a control message.

7. The method of claim 6, wherein the bit is selected from the signaling channel.

8. The method of claim 1, further comprising:
   acknowledging a reception of a control message sent by the radio transmitting device.

9. The method of claim 1, wherein detecting a quality degradation of the downlink radio channel depends on acknowledging a reception of a control message sent by the radio transmitting device.

10. The method of claim 1, wherein detecting a quality degradation comprises one or more of the following:
    a control message is not acknowledged;
    a number of control messages not being acknowledged is increased;
    measurement reports sent by the radio receiving device to the radio transmitting device over the radio channel indicate the quality degradation of the downlink radio channel; and
    the radio receiving device is operated in a compressed mode.

11. The method of claim 1, wherein the downlink data channel comprises a user data channel configured to transmit at least one of voice data and internet data.

12. The method of claim 1, further comprising:
    decreasing a transmission power of a further bit of the frame structure, the further bit differing from the selected bit.

13. The method of claim 12, wherein an overall transmission power of the frame structure does not exceed a predetermined threshold value.

14. The method of claim 1, further comprising:
    muting a transmission power of a further bit of the frame structure, the further bit differing from the selected bit.

15. The method of claim 1, further comprising:
    performing a cyclic redundancy check on the basis of data transmitted over the downlink data channel.

16. The method of claim 1, wherein the frame structure is based on one of the wireless standards UMTS, GSM and LTE.

17. The method of claim 1, wherein the frame structure is based on a 3GPP standard.

18. A radio transmitting device configured to transmit a frame structure over a downlink radio channel, the frame structure comprising
    a downlink control channel and a downlink data channel, the radio transmission device comprising:
      a detecting unit configured to detect a quality degradation of the downlink radio channel;
      a selecting unit configured to select a bit from the downlink data channel; and
      a power unit configured to increase a transmission power of the selected bit with respect to a transmission power of a non-selected bit of the downlink data channel when the quality degradation of the downlink radio channel is detected by the detecting unit.

19. The radio transmitting device of claim 18, wherein the detecting unit is configured to detect an acknowledgment acknowledging a reception of a control message, the control message being sent by the radio transmitting device.

20. The radio transmitting device of claim 18, wherein the power unit is configured to decrease a transmission power of a further bit, the further bit differing from the selected bit.

21. A method for transmitting data between a radio transmitting device and a radio receiving device, comprising:
    transmitting a frame structure over a radio channel, the frame structure comprising a control channel and a data channel;
    detecting a quality degradation of the radio channel;
    selecting a bit from the data channel; and
    increasing a transmission power of the selected bit when the quality degradation of the radio channel is detected,
    wherein detecting a quality degradation comprises one or more of the following:
      a control message is not acknowledged;
      a number of control messages not being acknowledged is increased;
      measurement reports sent by the radio receiving device to the radio transmitting device over the radio channel indicate the quality degradation of the radio channel; and
      the radio receiving device is operated in a compressed mode.

22. A method for transmitting data between a radio transmitting device and a radio receiving device, comprising:
- transmitting a frame structure over a radio channel, the frame structure comprising a control channel and a data channel;
- detecting a quality degradation of the radio channel;
- selecting a bit from the data channel;
- increasing a transmission power of the selected bit when the quality degradation of the radio channel is detected; and
- decreasing a transmission power of a further bit of the frame structure, the further bit differing from the selected bit.

* * * * *